United States Patent [19]
Wahl et al.

[11] 4,343,092
[45] Aug. 10, 1982

[54] PROBE GUIDE AND HOLDER

[75] Inventors: Robert O. Wahl, Sound Beach; William D. Hay, Peekskill; Raymond J. Prohaska, Locust Valley, all of N.Y.

[73] Assignee: UPA Technology, Inc., Syosset, N.Y.

[21] Appl. No.: 130,971

[22] Filed: Mar. 17, 1980

[51] Int. Cl.³ .............................................. G01B 7/06
[52] U.S. Cl. ................................. 33/169 R; 33/172 E
[58] Field of Search ............. 33/169 R, 172 R, 172 E, 33/147 E, 147 N; 248/DIG. 4; 324/229, 230, 231, 249, 260, 261; 73/78, 85, 150 R

[56] References Cited
U.S. PATENT DOCUMENTS 2,174,053  9/1939  Clarke ............................... 73/150 X

*Primary Examiner*—Harry N. Haroian
*Attorney, Agent, or Firm*—Nims, Howes, Collison & Isner

[57] ABSTRACT

A probe guide for holding a coating thickness measurement probe in contact with a coated workpiece such that repeatable thickness measurements may be made without the necessity of the user manually positioning the probe head for proper contact. The probe guide having a probe holding assembly mounted on a stand; the probe holding assembly constructed to permit the probe to swivel freely in any direction about the geometric center of the probe head face. A workpiece holding means is provided for holding the workpiece against a probe head of the probe. By positioning the workpiece holding means to forceably move the workpiece into contact with the probe head face, the probe will swivel until the resultant vector through the center of moment of the static forces through the workpiece acting on the probe head at the point or points of contact between the workpiece surface and the face of the probe head passes through the geometric center of the probe head face. With this construction, repeatable thickness measurements may be made and the probe may be used to measure coatings on workpieces which have complex shapes such as jewelry items and turbine blades.

5 Claims, 2 Drawing Figures

PROBE GUIDE AND HOLDER

BACKGROUND OF INVENTION

This invention relates in general to a probe holder and guide assembly for holding a measurement probe used in measuring a physical property of a workpiece and in particular to a probe holder and guide used in measuring coating thickness of a coated workpiece when the workpiece has a complex shape such as a jewelry item.

Instruments for non-destructively measuring the thickness of a coating on a substrate are known and have been widely used. These instruments utilize a probe which conventionally may either be hand held or mounted in a holder constructed to guide the probe under the control of the user into contact with the coating to be used. The probe may be, for example, a pencil-type model HH3 manufactured by UPA Technology, Inc., and includes a probe head which must contact the coating to be measured in order to made the measurement. With conventional apparatus, such as described in U.S. Pat. No. 4,155,009, beta backscatter techniques may be used to determine the coating thickness. With this apparatus, the probe head face is positioned in abutting relation with the coating and a measurement of the beta backscatter count is made during a measurement period to give an indication of the coating thickness.

One of the problems with hand held probes is the difficulty of positioning the probe head in relation to the coating surface such that repeatable measurements may be made. Typically, the measurement period is one-half minute and in general a user's hand is not sufficiently steady to maintain the same contact during the entire measurement period. Thus, error is introduced into the measurement process.

Probe holders were developed to hold the probe steady during the measurement process. An example of a conventional probe holder is described in U.S. Pat. No. 3,786,686 to William Hay et al. This holder includes a base on which the workpiece is mounted and means for holding the probe and for guiding the probe, under the control of the user, into contact with the workpiece. These holders maintain a constant contact between the probe head and the workpiece during the entire measurement period; however, they are most effective when the surface of the workpiece to be measured is flat. When measurements are made of more complex shapes, difficulties in obtaining accurate measurements are encountered because of the difficulty in properly positioning the probe head with respect to the coating surface such that repeatable measurements may be made. Attempts to modify the base holding the workpiece to accomodate these complex shapes, which may change from piece to piece, have not been successful and have not been practical.

SUMMARY OF THE INVENTION

The present invention overcomes the disadvantages of the prior art by providing a universal probe holder and guide which may be used in measuring coatings on workpieces with complex shapes to obtain accurate and repeatable results.

The universal probe holder and guide includes a probe holding assembly mounted on a base stand. The probe holding assembly includes structure for holding and supporting a probe such that the probe may swivel freely about a point located at the geometric center of the probe head face. A positionable workpiece holding means is also mounted on the base stand and holds the workpiece during the measurement period. When a measurement is to be taken, the workpiece is placed in the workpiece holding means and this means is positioned to force the portion of the workpiece which is to be measured into engagement with the probe head of the probe. The probe mounted in the probe holding assembly swivels in response to the force applied to a position where the resultant vector through the center of moment of the static forces through the workpiece acting on the probe head at the point or points of contact between the workpiece surface and the face of the probe head passes through the geometric center of the probe head face. The workpiece holding means is then secured and a measurement can be made.

BRIEF DESCRIPTION OF THE DRAWINGS

In order that the invention may be clearly understood and readily carried into effect, a preferred embodiment will now be described, by way of example only, with reference to the accompanying drawings wherein.

DESCRIPTION OF A PREFERRED EMBODIMENT

Figure 1:
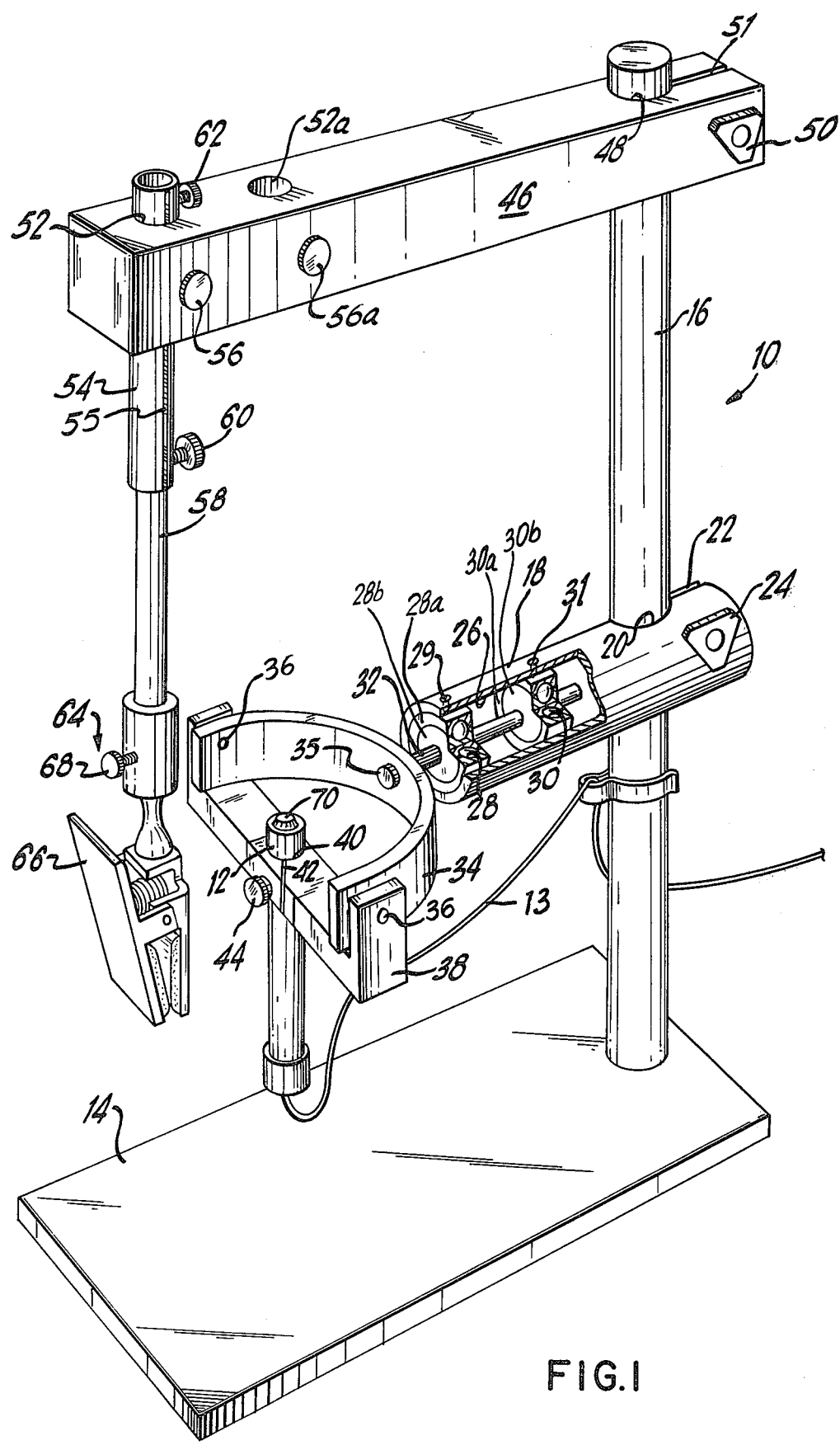
FIG. 1 shows the probe holder and guide having a probe mounted in the gimbal according to the present invention.

FIG. 1 shows, by way of example, a preferred construction of a probe holder and guide 10 for holding a measurement probe 12. The probe 12 is connected via lead 13 to a measurement instrument (not shown). The probe holder and guide 10 includes a base 14 on which is mounted an upright support standard 16. An elongate support arm 18 has a transverse bore 20 through which the support standard 16 extends. One end of the support arm 18 has a transverse slot 22 aligned with the axis of the transverse bore 20 and extending to the transverse bore 20. A thumb screw 24 is provided which threadably extends through the walls of the support arm 18 on either side of the slot 22 so that by tightening the thumb screw 24 the support arm 18 may be clamped to the upright support standard 16. The end of the support arm 18 opposite the slot 22 includes an axial bore 26 in which preferably two axially separated split race ball bearing units 28 and 30 are mounted. These ball bearing units support a gimbal shaft 32 on the axis of axial bore 26 for rotational movement about the axis of bore 26 which coincides with the axis of gimbal support 18. Set screws 29 and 31 secure the outer ball bearing races 28a and 30a in bore 26. The inner races 28b and 30b are secured to shaft 32 by an adhesive such as sold by Loctite Corporation under the trademark LOCTITE.

One end of the gimbal shaft 32 extends beyond the end of the gimbal support 18 and is fixedly secured to a first gimbal ring 34 with for example, a socket cap screw 35 as shown in FIG. 1. In a preferred embodiment, the first gimbal ring 34 is semicircular as shown in FIG. 1 and the gimbal shaft 32 is affixed to the midpoint between the ends of this first gimbal ring 34. The ends of the first gimbal ring are rotatably mounted as with pins 36 to a second gimbal ring 38. The first and second gimbal rings 34 and 38 together form a gimbal. In a preferred embodiment, the second gimbal ring 38 has a squared "U" shape with the two upright legs being shorter than the transverse leg. The second gimbal ring 38 has a transversely extending bore 40 at the midpoint of the transverse leg through which the probe 12 is inserted. An obliquely extending slot 42 extends between the bore 40 and one side edge of the second gimbal ring 38. A thumb screw 44 extends across the slot 42 such that by tightening the screw 44, the probe 12 is securely mounted in bore 40. With the probe 12 being mounted in a gimbal, the probe 12 may swivel freely in any direction. Before tightening thumb screw 44, the probe 12 is positioned so that the probe 12 will swivel about the geometric center of the probe head face 70.

It is contemplated that other assemblies may be used for holding the probe such that the probe may swivel freely such as a spherical bearing assembly, an elastomeric mounting arrangement or fluid filled rings. All such other assemblies are considered to be within the scope of the present invention.

A workpiece clamp support beam 46 is also secured to the upright standard 16 by means of transverse bore 48 through which the upright standard 16 extends. A thumb screw 50 and slot 51 arrangement secures the support beam 46 to upright standard 16 by tightening screw 50. At the end of the clamp support beam 46 opposite the end secured to the upright standard 16, a transverse bore 52 is provided through which slidably extends a hollow tube 54. A longitudinal groove 55 is provided on the outer surface of hollow tube 54. In a preferred embodiment, as shown in FIG. 1, the tube 54 extends generally downwardly toward the base 14. The tube 54 is prevented from rotational movement in bore 52 by guide pin 56 mounted in clamp support beam 46 and extending into seating engagement with groove 55. A clamp rod 58 has a diameter selected to slidably fit inside tube 54. The clamp rod 58 may be moved upwardly or downwardly, as shown in FIG. 1, and may be held in a particular vertical position by tightening thumb screw 60. A thumb screw 62 together with thumb screw 60 act as vertical stops to limit the downward and upward movement, respectively, of tube 54. Tube 54 may be inserted in another bore 52a. This bore together with corresponding guide pin 56a may be used if appropriate in properly positioning the workpiece against probe head face 70 during a measurement.

Figure 2:
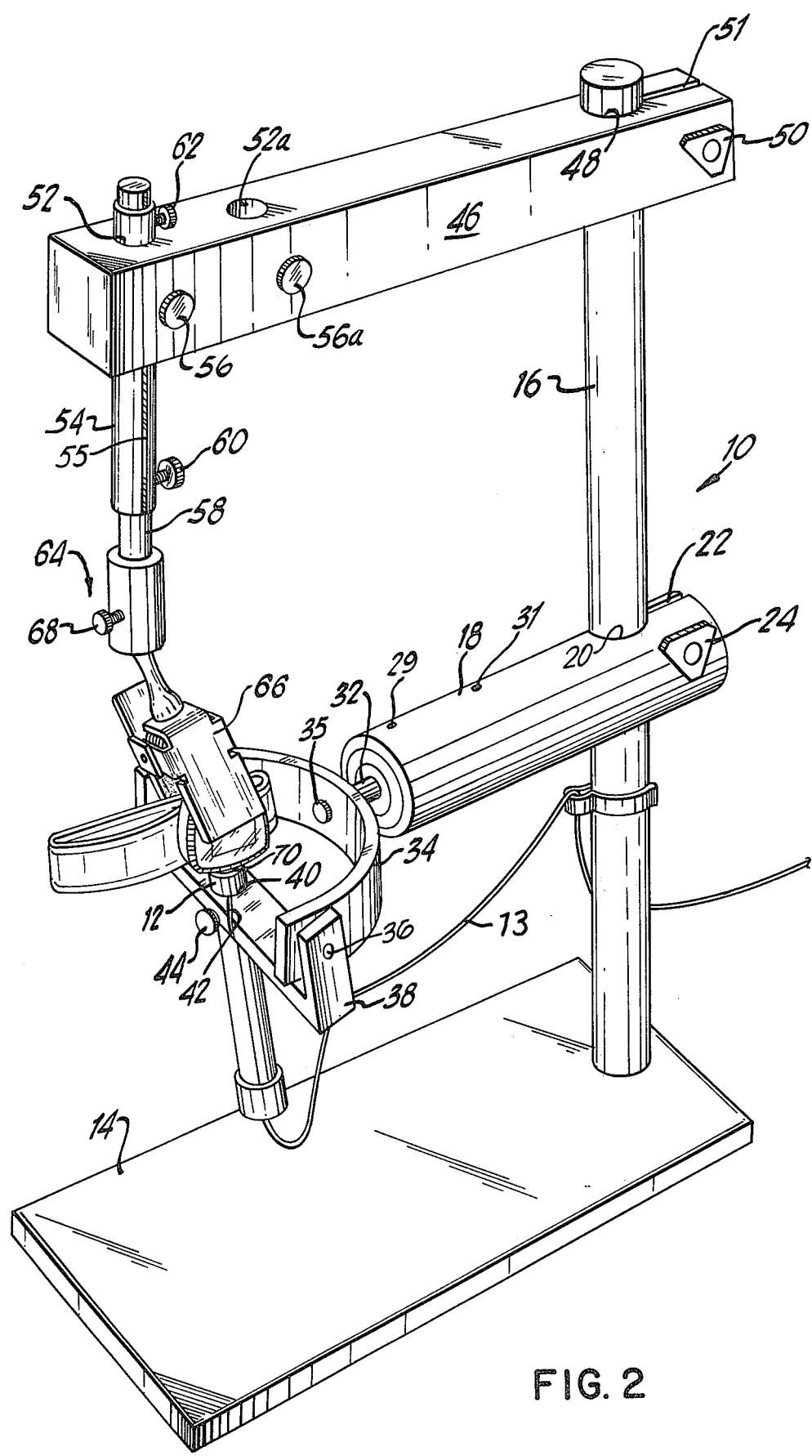
FIG. 2 shows the probe holder of FIG. 1 with the clamp holding a workpiece in position for a measurement according to the present invention.

At the lower end of clamp rod 58 as shown in FIG. 1, is mounted a conventional ball swivel assembly 64, having a locking thumb screw 68 for locking the swivel assembly in a selected position. A spring biased clamp 66 is affixed to the ball swivel assembly 64. The clamp 66, being mounted to the ball swivel assembly 64, may be swiveled in any direction. Once a position is selected, clamp 66 may be secured in this position with locking thumb screw 68. The clamp 66 is used to hold the workpiece to be measured as shown in FIG. 2. The above description of clamp means for holding the workpiece was for purposes of illustration only. Other means such as pressure pins could be used for holding the workpiece against a probe head face 70 of probe 18 and are considered to be within the scope of the present invention.

To use the probe holder and guide 10, a workpiece having the coating to be measured is placed in the clamp 66. The set screws 60 and 68 are loosened so that the clamp rod 58 and ball swivel assembly 64 are freely movable. The workpiece to be measured is positioned to abut the probe head face 70 of probe 12. The set screw 68 is then tightened to lock the ball swivel assembly 64 in this position. Then the clamp rod 58 is moved downwardly, either forceably by the user or if appropriate by the weight of the clamp and the workpiece, bringing force to bear on the probe head face 70. The probe 12, being able to swivel freely in any direction, will swivel until the resultant vector through the center of moment of the static forces through the workpiece acting on the probe head at the point or points of contact between the workpiece surface and the face of the probe head passes through the geometric center of the probe head face. The set screw 60 may then be tightened to secure the workpiece in abutting relation with probe head face 70. In a preferred embodiment, the weight of the clamp and the workpiece is sufficient to cause the probe to swivel to the proper position. If it is not, it is contemplated that the clamp rod 54 be moved downwardly forceably by the user and locked in the downward position by a set screw (not shown) mounted in clamp support beam 46.

Thus, with this universal probe holder and guide 10, thickness measurements may now be made with the probe head face 70 being maintained securely in the optimum measuring position for the duration of the measurement period. This probe holder and guide 10 is particularly useful in measuring workpieces with complex shapes such as jewelry items, table flatware, turbine blades and fan blades to name a few applications.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claims:

We claim:

1. A probe holder and guide for holding a nondestructive thickness measuring probe in contact with a workpiece having a coated substrate comprising:
   a base;
   a gimbal assembly mounted on the base having means for holding the probe such that the probe may swivel freely about a point located at the geometric center of a face of a probe head of the probe;
   a workpiece clamp means, supported on the base, for holding the workpiece;
   means for positioning the workpiece clamp means to forceably move the workpiece into abutting relation with the face of the probe head to cause the probe to swivel until the resultant vector through the center of moment of the static forces through the workpiece acting on the probe head at the point or points of contact between the workpiece surface and the face of the probe head passes through the geometric center of the probe head face;
   means for securing the workpiece clamp means after the workpiece clamp means is positioned to secure the relation between the workpiece and the probe head during a measurement period.

2. A probe holder and guide for holding a measurement probe in contact with a workpiece to be measured comprising:
   a probe holding assembly mounted on a base having means for holding the probe such that the probe may swivel freely about a point located at the geometric center of a face of a probe head of the probe;

workpiece holding means for holding the workpiece; and means for positioning the workpiece holding means to forceably move the workpiece into abutting relation with the face of the probe head to cause the probe to swivel until the resultant vector through the center of moment of the static forces through the workpiece acting on the probe head at the point or points of contact between the workpiece surface and the face of the probe head passes through the geometric center of the probe head face.

3. The probe holder and guide according to claim 2 wherein the probe holding assembly comprises a gimbal assembly.

4. The probe holder and guide according to claim 2 wherein the workpiece holding means includes a clamp.

5. The probe holder and guide according to claim 2 further including means for securing the workpiece holding means after the workpiece holding means is positioned to secure the relation between the workpiece and the probe head during a measurement period.

* * * * *